Figure 1:
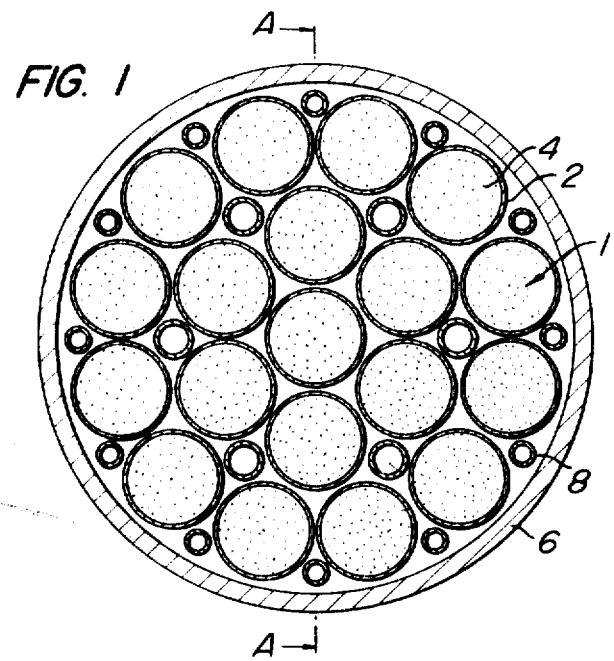

May 9, 1967  TAKAHIRO MORITA  3,318,778

NUCLEAR FUEL ELEMENT

Filed Feb. 25, 1965

INVENTOR
TAKAHIRO MORITA

BY Paul M. Craig, Jr.

ATTORNEY

United States Patent Office 3,318,778
Patented May 9, 1967

3,318,778
NUCLEAR FUEL ELEMENT
Takahiro Morita, Hitachi-shi, Japan, assignor to
Hitachi, Ltd., Tokyo, Japan
Filed Feb. 25, 1965, Ser. No. 435,146
Claims priority, application Japan, Feb. 27, 1964,
39/10,423
7 Claims. (Cl. 176—64)

This invention relates to a fuel element which is used in a heavy water moderated reactor containing light water or an organic coolant.

In this kind of reactor, a reactor core generally comprises a desired number of pressure tubes each of which includes a plurality of clad tubes each containing nuclear fuel. Said pressure tubes also include cooling light water or an organic material such, which is, for instance, biphenyl as introduced thereinto. On the other hand, the pressure tube is encircled by heavy water which acts as a moderator. Although heavy water may be used as a coolant in reactors of this kind, the mass production of heavy water is not easy and therefore the construction and operating costs of such a reactor plant are expensive. Moreover, the so-called "Tritium hazard" which appears in the plant and its invirons cannot be disregarded.

As is commonly known, in case said light water or organic materials are to be used as a coolant, as the neutron absorptive power thereof is much larger than that of heavy water, the preferred fuel material to be used is such that it has a large productive power of neutrons, for instance, enriched uranium 235. Furthermore, it is generally known that this kind of reactor has a large positive reactivity temperature and void coefficient with respect to variations of the temperature and the void of said coolant, and therefore, in case said reactor contains too much coolant, there is a danger that an increase of the temperature of said coolant or the amount of voids appearing in said coolant during the operation of said reactor may gradually increase the reactivity of the reactor and then may cause the reactor to get out of control. As the result of this type of problem, the quantity of the coolant to be contained in reactors of this type is preferably minimized as much as possible.

The primary object of this invention is to decrease the quantity of light water or organic material, which is used as the coolant of a reactor, for the purpose of improvement on neutron economy.

Heretofore it has been generally believed that enriched nuclear fuel having a large productive power of neutrons is necessary for the operation of the reactors of the aforesaid kind. However, it will be readily understood from the above description that a nuclear fuel having a smaller productive power of neutrons such as, for instance, natural uranium may be used for the operation of said reactors by decreasing the quantity of said coolant employed therein.

A further object of this invention is to make the reactivity coefficients of said reactor shift to the negative side by decreasing the quantity of the coolant, having a large neutron absorptive power, employed, thereby preventing the reactor from getting out of control and running away and facilitating the control of the reactivity of said reactor during the operation thereof.

The fuel element of this invention comprises a plurality of fuel rods each having nuclear fuel enclosed in a clad tube, a pressure tube including said fuel rods, and a plurality of hollow tubes, formed of material which has a small neutron absorptive power, which are positioned between said fuel rods inside saidp ressure tube. By positioning said hollow tubes as explained above, it is possible to decrease the volume of said coolant without exerting a serious influence upon the cooling power of the coolant.

The inside of said hollow tube may be evacuated or it may be filled with helium gas, but in this case there is a danger that said hollow tube will be collapsed by the pressure of said circumferential coolant. In order to prevent said tube from such a collapse, it is desirable to fill the inside of said tube with material such as, for instance, magnesia, which has a very small neutron absorptive power.

Figure 2:
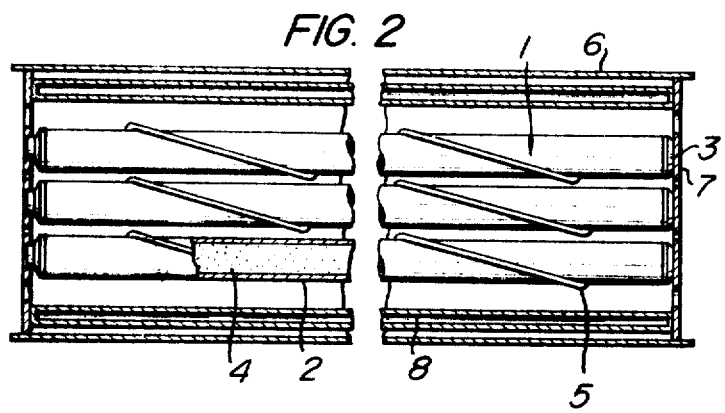

The above and other objects and advantages of the present invention will become apparent from the following description when taken in conjunction with the accompanying drawing, in which:

FIG. 1 is a transversal cross-sectional view of one embodiment of the present invention, FIG. 2 is a longitudinal cross-sectional view taken along line A—A of FIG. 1.

Referring to the drawing, a fuel rod 1 comprises a clad tube 2, the opposite ends of which are welded by plugs 3, and nuclear fuel 4 enclosed therein in the form of uranium dioxide pellets. Around said clad tube 2 is spirally wound a wire 5 which serves as a spacer as is clearly shown in FIG. 2. In this embodiment, a cylindrical pressure tube 6 has two end plates 7 on which nineteen fuel rods are fixedly mounted in parallel with one another. The pressure tube 6 is encircled by heavy water.

As illustrated in FIG. 1, eighteen hollow tubes 8 are positioned in parallel with and between said fuel rods 1 inside said presure tube 6 in order to decrease the quantity of coolant employed such as, for instance, light water or an organic material, which is introduced between said fuel rods 1 and said hollow tubes 8. Said hollow tube is made of material, for instance, zirconium, having a small neutron absorptive power, and the inside of said hollow tube is filled with helium gas or magnesia, if necessary, which has a small neutron absorptive power.

While a preferred embodiment of the invention has been described, the foregoing description should be taken as merely illustrative and not definitive, and the scope of the invention should be limited only by the following appended claims.

What is claimed is:

1. A nuclear fuel element for use in a heavy water moderated reactor containing light water or an organic coolant, comprising a pressure tube into which said light water or organic coolant is introduced, a plurality of fuel rods contained within said pressure tube, each of said rods comprising a clad tube and nuclear fuel material housed therein, and a plurality of hollow tubes closed at the ends thereof, said hollow tubes being constituted by a material having a small neutron absorptive cross-section and being positioned at random between said fuel rods within said pressure tube to decrease the quantity of said light water or organic coolant employed within said pressure tube.

2. A nuclear fuel element according to claim 1, wherein the inside of said enclosed hollow tubes is evacuated.

3. A nuclear fuel element according to claim 1, wherein the inside of said enclosed hollow tubes is filled with a material having a small neutron absorptive cross-section.

4. A nuclear fuel element according to claim 3, wherein said material having a small neutron absorptive cross-section is magnesia.

5. A nuclear fuel element according to claim 3, wherein said material having a small neutron absorptive cross-section is helium gas.

6. A nuclear fuel element according to claim 1, wherein said hollow tubes are made of zirconium and wherein the inside of said enclosed hollow tubes is evacuated.

7. A nuclear fuel element according to claim 1, wherein said hollow tubes are made of zirconium and wherein the inside of said enclosed hollow tubes is filled with a material having a small neutron absorptive cross-section.

References Cited by the Examiner

UNITED STATES PATENTS

| | | | |
|---|---|---|---|
| 3,081,249 | 3/1963 | Whittemore | 176—92 |
| 3,172,821 | 3/1965 | Meyers | 176—78 |

FOREIGN PATENTS

| | | |
|---|---|---|
| 553,485 | 5/1943 | Great Britain. |
| 822,790 | 10/1959 | Great Britain. |
| 927,071 | 5/1963 | Great Britain. |

CARL D. QUARFORTH, *Primary Examiner.*

BENJAMIN R. PADGETT, *Examiner.*

M. J. SCOLNICK, *Assistant Examiner.*